Patented Mar. 31, 1936

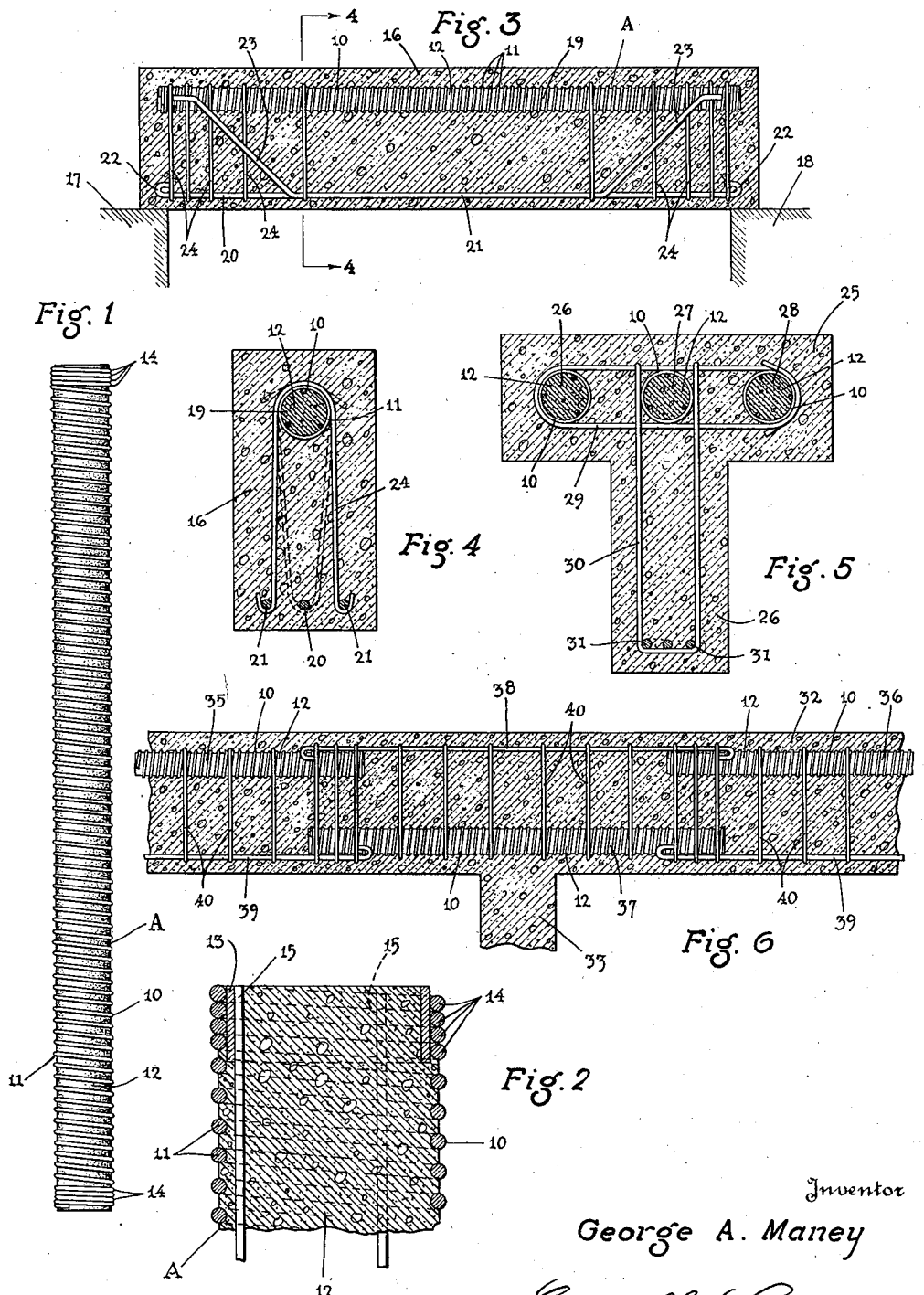
March 31, 1936. G. A. MANEY 2,035,662
STRUCTURE FOR TRANSMITTING LOADS
Filed June 17, 1932 2 Sheets-Sheet 1
Inventor
George A. Maney

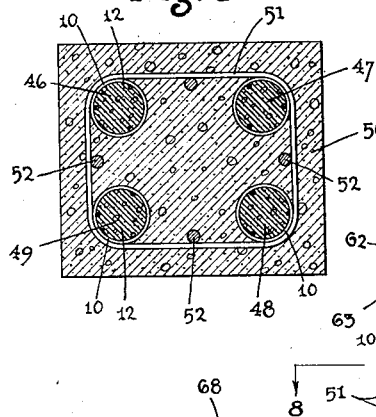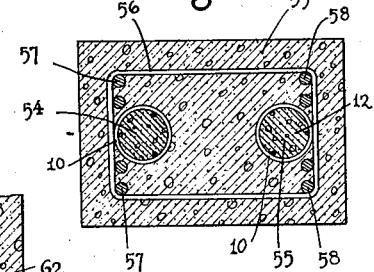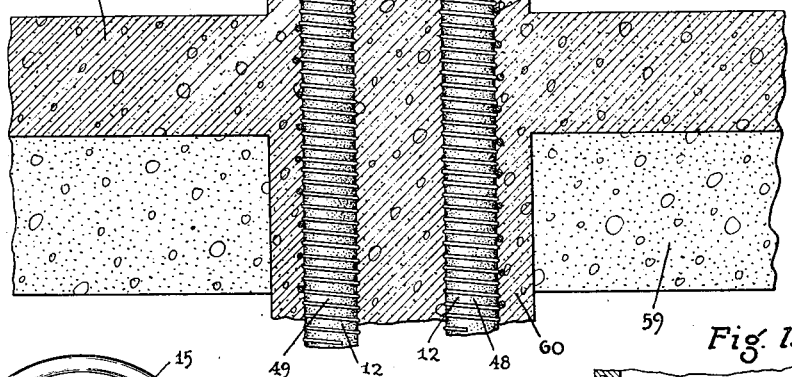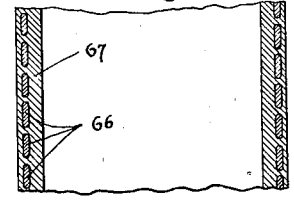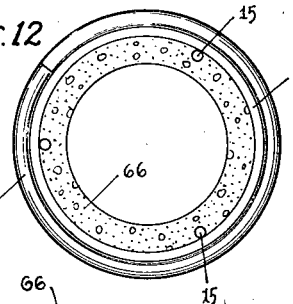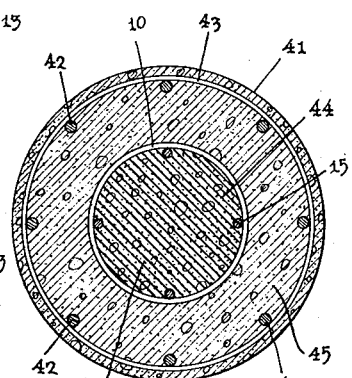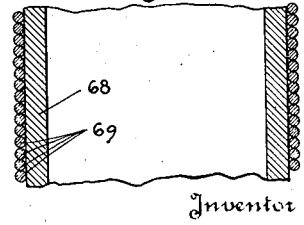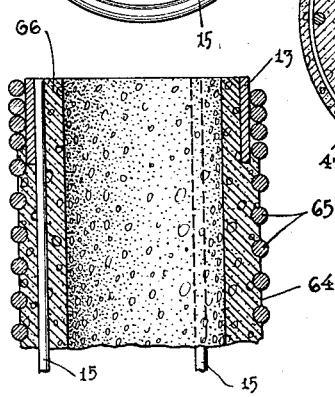

2,035,662

UNITED STATES PATENT OFFICE 2,035,662

STRUCTURE FOR TRANSMITTING LOADS

George A. Maney, Evanston, Ill.

Application June 17, 1932, Serial No. 617,750

17 Claims. (Cl. 72—61)

My invention relates to structures for transmitting loads and particularly to structures for transmitting loads through compression such as columns or the compression elements of beams or the like.

An object of the invention resides in providing a structure of such nature in which the disadvantages arising through shrinkage are practically eliminated.

Another object of the invention resides in providing a structure in which the disadvantages arising through plastic flow are greatly reduced.

A still further object of the invention resides in providing a structure in which economy of materials results.

A feature of the invention resides in employing a tubular shell having a core therein and in constructing the core of a material having an elastic limit, under compression lower than the elastic limit of the tubular shell under tension.

An object of the invention resides in initially stressing or preloading either the core or the shell to bring the shell normally into tension.

Another object of the invention resides in procuring initial tension in said shell by preloading the core beyond its elastic limit in compression.

A still further object of the invention resides in constructing the shell of a wire wound in the form of a helix.

An object of the invention resides in constructing the shell of a metal and the core of concrete, plaster of Paris, or some similar substance.

An object of the invention resides in constructing the core either hollow or solid.

Another object of the invention resides in constructing the shell of steel and the core of cast iron integrally connected together.

Other objects of the invention reside in the novel combination and arrangement of parts and in the details of construction hereinafter illustrated and/or described.

In the drawings:

Fig. 1 is an elevational view of a loading structure illustrating an embodiment of my invention.

Fig. 2 is a longitudinal sectional view of the upper portion of the structure shown in Fig. 1.

Fig. 3 is an elevational sectional view of a simple beam illustrating the application of my invention thereto.

Fig. 4 is a sectional view taken on line 4—4 of Fig. 3.

Fig. 5 is a view similar to Fig. 4 showing the invention used in a T beam.

Fig. 6 is a view similar to Fig. 3 showing the invention used with a continuous beam.

Fig. 7 is an elevational view showing the method of using the invention in a large column.

Fig. 8 is a sectional view taken on line 8—8 of Fig. 7.

Fig. 9 is a sectional view of a column similar to Fig. 8 showing a different application of the invention.

Fig. 10 is a cross sectional view similar to Figs. 8 and 9 showing another method of utilizing the invention.

Fig. 11 is an elevational sectional view showing a portion of a modification of the invention.

Fig. 12 is a plan view of the structure shown in Fig. 11.

Fig. 13 is a view similar to Fig. 11, showing the method of using the invention in the construction of cast iron pipes.

Fig. 14 is a view similar to Fig. 13 of still another form of the invention.

In the construction of concrete columns and beams shrinkage always occurs which is due to hardening and drying and not to temperature. At the same time the compression element of the beam due to the dead weight of the building is compressed which together with plastic flow causes the beam or column to deflect or shorten considerably, thereby causing cracks and other deformations which are highly undesirable in building or similar construction. The present invention seeks to overcome these difficulties by providing a structure in which the compression element is normally stressed so as to greatly reduce plastic flow and to place initial stress upon the structure tending to reduce the deflections and deformations heretofore referred to, this being done after practically all the shrinkage has occurred. In the use of spiral or helical wound steel wire in concrete construction it has heretofore not been customary to count on such wire as taking any appreciable part of the load, due to the fact that a loading of the column or compressive element having such spirals in it in a manner to place the steel under tension would cause a deflection or shortening beyond permissible limits. The present invention places initial tension upon the helical reinforcing steel whereby the same may be utilized to its maximum extent and whereby a much greater percentage of such steel up to ten to fifteen times greater may be used with the compression element than would otherwise be possible to resist compression stresses.

One form of my invention shown in Figs. 1 and 2 comprises an elongated structure A which is especially designed to transmit loads through compression. This structure includes a tubular shell 10 which may be constructed of a helix of wire 11 coiled or wound as illustrated. Within the shell 10 is disposed a core 12 of concrete which may be cast into said tubular shell in the customary manner.

The structure A is constructed as follows: The tubular shell, as stated, is formed of a helical coil 11 constructed from a suitable wire such as steel and in the form shown. A wire having a high ultimate strength up to 150,000 pounds per square inch and with a corresponding high elastic limit is advantageous, the ordinary steel such as is now used for concrete reinforcing may also be used. Within this coil is mounted at each end a ring 13 which is welded or otherwise secured to the end convolutions 14 of the tubular shell 10. Within the ring 13 are provided three light longitudinally extending rods 15 which may likewise be welded to the ring 13. These rods serve to temporarily stiffen the entire tubular shell during the formation of the load carrying structure and also prevent breaking of the same during the handling thereof after the structure has been completed.

The entire tubular shell 10 after assembly is placed in a suitable form and concrete poured and tamped into the interior thereof to form the core 12. The concrete is then allowed to set in the usual manner and the form in which the concrete is poured removed therefrom.

The form used in the construction of the load carrying structure A may be constructed with grooves to receive the various convolutions of the tubular shell 10 which hold the same in proper equally spaced relation. Such construction would bring the concrete up to the center of the wire or rod used in the construction of the helix which would prevent chipping of concrete during the subsequent preloading of the structure. The forms are split longitudinally so as to permit of the ready removal of the load transmitting structure from the mold after the concrete has been properly set.

After pouring, the structure is allowed to cure in the air or, if desired, the same may be steam cured as is now well known in the art to reduce the plastic flow and accelerate shrinkage. After the concrete has reached a sufficient age to give it a reasonable strength and to bring about substantially maximum shrinkage, a load is applied to the ends of the structure A which is of such magnitude that the concrete core 12 is stressed beyond its elastic limit, and the convolutions of the wire helix 11 brought into tension. As is well known, the elastic limit of concrete under compression is considerably below the elastic limit of steel used for reinforcing purposes. Due to this reason the concrete takes a permanent set and the steel is initially maintained in partial tension. When thereafter a load is applied to the structure A, the steel being already in tension, the stresses due to the load are immediately transferred to the tubular shell 10 and the load carried without the usual shortening or deflection resulting when beams or columns are constructed in the usual manner. The vertical rods 15 employed with the load transmitting structure are not intended to carry any of the load under compression and are hence constructed relatively light. These rods are compressed with the concrete structure and, although not necessarily stressed beyond their elastic limit, are of such small cross sectional area as to not appreciably affect the results desired.

In the construction of compression elements in accordance with my invention, I have found that a percentage of helical steel of from twelve to twenty per cent based on the ratio of the volume of the helical steel to the volume of the core may be advantageously used. With such percentages, a steel may be employed with elastic limits of from 150,000 pounds to 250,000 pounds per square inch which is about four times as high as usually employed for the helical steel in ordinary concrete columns. With as low a steel ratio as twelve per cent I have been able to procure specimens which carry a unit load without yielding which is greater than the elastic limit of high carbon steels as used in concrete reinforcing and which weigh only forty per cent as much as similar specimens constructed in the usual manner.

Although preloading may be carried out any time after the concrete has received its permanent set, I find that early preloading at ages of two or three days is advantageous. Also repeated preloading at subsequent periods is desirous. If two preloadings are employed, two days and fourteen days would be suitable. Where several successive loads are applied the subsequent loads are preferably made greater than the earlier loads.

Where preloading is accomplished through compression of the core a shortening of five to ten per cent of the length of the unit is sometimes necessary to bring the units up to full capacity.

In practical use the units may be constructed from two inches in diameter and upwards. The greatest practical diameter would be approximately twelve inches requiring about twenty per cent helical steel. Such construction would necessitate one inch rods at a pitch of as close to one inch as practical. For the smaller sizes which would be more practical a hard drawn wire could be used having a greater ultimate strength than steel rods and a higher elastic limit. Some of the alloy steels now used for various purposes and having high elastic limits may be advantageously used.

With the load transmitting structure constructed as specified, loads may be immediately transmitted by the same without the usual deflections or shortening resulting when the entire construction with which the load transmitting structure is employed, is originally cast in monolythic form. This is due to the fact that plastic flow is restrained through the shell which is already under partial stress. Since the preloading is performed after practically all of the shrinkage has taken place it will readily be comprehended that the disadvantages arising from shrinkage and plastic flow are practically eliminated.

The method of using the invention is shown in Figs. 3 to 10. In Figs. 3 and 4, a simple beam 16 has been shown which is constructed of concrete and which is adapted to rest upon two supports 17 and 18. This beam is provided at the upper portion of the same with one of the load transmitting structures A which is indicated at 19. This structure is placed near the upper portion of the beam and extends substantially throughout the entire length thereof. At the lower portion of the beam are provided longitudinal reinforcing rods 20 and 21 which extend throughout the lower portion of the beam. The rods 20 may extend to the ends of the beam and be formed with hooks 22 while the rods 21 may be bent upwardly as designated at 23, to resist shearing stresses in the beam. In addition to the bent up rods, stirrups 24 may be employed which are suspended from the load transmitting structure A and which support the rods 20 and 21 in the customary manner. The particular location and arrangement of the steel used to resist tension and shear stresses in the beam does not form any particular feature of this invention and has not been disclosed in detail, though it can readily be comprehended that ordinary methods of design such as are now used for reinforced concrete construction may be employed and the load transmitting structure 19 may be designed to resist the entire compression stresses of the beam, the remainder of the concrete in the beam not being relied on. The concrete, after the reinforcing has been erected, is poured in the usual manner and allowed to set as customary. When the beam is constructed as disclosed, the load transmitting structure 19 immediately resists compression stresses without requiring appreciable shortening or deflection of the beam, thereby preventing the various deformations and disadvantages incident with the usual type of concrete construction, as hereinbefore specifically pointed out.

In Fig. 5 I have shown a T shaped type of beam having a flange 25 and a web 26 depending therefrom. In this form of the invention three load transmitting structures 26, 27 and 28 are employed which are disposed in the flange 25. These various structures may be tied together through transverse tie wires or rods 29. Stirrups 30 may be hung from these ties, which stirrups support the tension reinforcing rods 31 in the customary manner. The form of the beam shown in Fig. 5 has the instant properties of T beams which are well known in the art.

My invention may be equally as well used in continuous beams as in simple beams. Such construction is shown in Fig. 6. In this figure the beam is designated at 32 and one of the supports over which the beam is continuous is designated at 33. In this form of the invention load transmitting structures 35 and 36 are employed which are disposed in the upper portion of the beam intermediate the supports thereof. In addition to the load transmiting structures 35 and 36 other load supporting structures 37 are employed which are disposed in the lower portion of the beam above the support 33 and which are utilized to resist negative bending moments. These structures overlap the structures 35 and 36 somewhat as clearly shown in the drawings.

In addition to these load supporting structures 35, 36 and 37, tension rods 38 and 39 are employed which are disposed between the various load transmitting structures. Suitable stirrups 40 are also employed which are connected to the various reinforcing rods and load transmitting structures and which are closest at the points of zero deflection of the beam where the shear is the greatest, namely at the overlapping ends of the various load transmitting structures.

In the use of my invention in columns, the load transmitting structure may be directly employed as a column and encased in concrete to protect and partially stiffen the same. If desired, however, the same may be used as part of an ordinary reinforced concrete column, such as shown in Fig. 10. In this figure the column proper is indicated at 41 and consists of a number of vertical rods 42 contained within a spiral or helical coil 43 of suitable wire to which the said rods are either welded or tied. Within the interior of the column proper is disposed a load transmitting structure 44 which is constructed in accordance with my invention. The entire column is poured with concrete indicated at 45 to form a unitary construction. A column constructed in this manner may be constructed with less steel in the rods 42 than would otherwise be required and at a correspondingly lesser cost.

In Figs. 7 and 8 I have shown four load transmitting structures 46, 47, 48 and 49 used in a single column 50 of rectangular cross section. These structures are arranged near the corners of the column and are tied together through suitable ties 51 which may be of light steel and which serve merely to hold the entire structure firmly united together. If desired, additional reinforcing rods 52 may be employed which supplement the action of the structures 46, 47, 48 and 49, and which assist in stiffening the column proper and in resisting tension in the beam caused through eccentric loading.

The column 53 shown in Fig. 9 illustrates the use of two load transmitting structures 54 and 55 which are used at opposite sides of a column of rectangular cross section. Ties 56 securing these parts together are made somewhat larger than the enclosed structure to leave room for vertical rods 57 and 58 disposed adjacent the said load transmitting structures. The column 53 is particularly adaptable for eccentric loading or loading in which tension may occur on one side or the other of the column.

In multiple story buildings where the columns are formed in continuation through the stories, the construction of the columns of a single length is impractical. In such case the columns are constructed in sections and connected together at each story. In Fig. 7 a structure has been shown whereby the columns may be readily connected together. In this figure a floor 58 has been shown which is carried by beams 59 supported on a column 60. The column 60 may be of the type shown in Fig. 8 consisting of the various load transmitting structures 46, 47, 48 and 49. These load supporting structures are of such a length that when the building is being erected the said structures extend somewhat above the upper surface of the floor 68. The reinforcing rods in such cases are likewise caused to extend above the floor as is now common practice. For the purpose of bringing the superimposed load supporting structures 61 in direct load transmitting contact with the load supporting structures in the floor below, sleeves 62 are employed which encircle the said load supporting structure at their upper ends. A grout 63 is placed within said sleeves and upon the upper ends of the various load supporting structures 46, 47, 48 and 49 and the superimposed load supporting structures 61 then inserted in said sleeves and caused to rest upon the grout confined within the sleeves. When the grout 63 sets, a unitary construction results by means of which the load is directly transmitted from one load supporting structure to the other and without appreciable shortening of the structure.

My invention may be advantageously used with hollow cores as well as solid cores. In Figs. 11 and 12 one such type of construction is shown. In these figures the load transmitting structure is indicated at 64, the tubular shell at 65 and the core proper at 66. Construction such as shown in Figs. 11 and 12 may be used for conduits operating under internal pressure as well as for load transmitting structures as heretofore described. In the case of hollow structures the preloading may be secured in the same manner as for solid structures, either by stressing the core axially in compression beyond its elastic limit or by winding the helical shell under a tension valve below its elastic limit.

In Fig. 13 I have shown my invention employed in conjunction with cast iron pipes. The shell is designated at 66 and is constructed from a flat ribbon which is wound in the form of a helix to form the shell proper. A cast iron core designated at 67 is cast around the shell and may be constructed in accordance with the method now in use in which cast iron is flowed into the mold while the mold is revolving and caused to form the pipe through centrifugal force without the use of a core in the mold proper. A similar method is used for concrete pipes since concrete sets rapidly under centrifugal action. A pipe constructed in accordance with my invention may thereafter be compressed axially to place the shell in tension. Such preloading is, however, not as essential with cast iron pipe as with concrete due to the lesser shrinkage and plastic flow of cast iron. Cast iron pipe so constructed has a considerably greater strength to resist pressure than cast iron pipe constructed in the ordinary manner and may therefore be constructed with considerably less material than would otherwise be required.

In Fig. 14 a structure has been shown in which a core 68 is first constructed in the usual manner. Upon the exterior of this core is wound a spiral 69 of steel or some other suitable material which is wound under tension to cause the same to have an initial stress when the structure is completed. This eliminates the necessity of initially preloading the structure, giving the same benefits as when the structure is built as previously described. This form of the invention may employ a solid or hollow core constructed of cast iron, concrete or similar substances and the wire may be flat, circular or of any other desired cross section.

If desired, a flat ribbon may be used instead of round wire for the tubular shells employed with any of the forms of my invention, whether the same are used in cast iron pipes or concrete load transmitting structures or pipes and likewise round wire or wire of any cross section may be used in the cast iron pipe or in any of the other forms of the invention.

My invention is highly advantageous in that an extremely economical and efficient construction is provided whereby the loads on buildings or similar structures may be readily and effectively transmitted. By the use of my invention the disadvantages arising through shrinkage and plastic flow are greatly reduced. The amount of steel and concrete required in columns is appreciably reduced by using my invention. A saving of approximately sixty per cent in weight may be effected through the use of my invention. The compression element of my invention is pretested due to the initial loading of the same so that the load which it is capable of carrying is accurately determinable in advance of installation. With my invention I am able to procure a unit loading without yielding which is greater than the elastic limit of ordinary high carbon reinforcing steel. A high percentage of helical steel may be used in which the full allowable tensile strength may be developed. Steel may be employed having elastic limits of from 150,000 pounds per square inch to 250,000 pounds per square inch. Concrete units constructed in accordance with my invention will have a much greater unit strength per unit of weight than any known material.

Changes in the specific form of my invention, as herein disclosed, may be made within the scope of what is claimed without departing from the spirit of my invention.

Having described my invention, what I claim as new and desire to protect by Letters Patent is:

1. A structure for transmitting loads comprising a tubular shell formed of steel, a cast iron core within said shell, integrally united with said shell, said core and shell being initially compressed the core being stressed beyond its elastic limit to bring the tubular shell into tension.

2. A column comprising a tubular shell, a core within said shell arranged in direct contact with the inner surface of the shell and having a lower elastic limit under compression than the elastic limit of said shell under compression, said core being pre-loaded beyond its elastic limit to bring said shell into tension.

3. The method of forming load transmitting units which consists in casting a core within a tubular shell and in contact therewith and in thereafter successively loading the core beyond its elastic limit to place an initial stress upon the shell.

4. The method of forming load transmitting units which consists in casting a core within a tubular shell and in contact therewith, in thereafter loading the core axially beyond its elastic limit to place an initial stress upon the shell and in thereafter removing the load from the core prior to the use of the unit.

5. The method of forming concrete columns which consists in casting an axial concrete core within a steel tubular shell, and in contact therewith in thereafter placing a load on the column to produce axial foreshortening of the column and of sufficient magnitude to stress the core beyond its elastic limit and to provide a tensile stress in the shell and in thereafter and prior to the use of the column removing the load.

6. The method of forming concrete columns which consists in casting an axial concrete core within a steel tubular shell and in contact therewith, in thereafter and before the concrete has been sufficiently cured for actual use placing a load on the column to produce axial foreshortening of the column and of sufficient magnitude to stress the core beyond its elastic limit and to provide a tensile stress in the shell and in thereafter and prior to the use of the column removing the load.

7. A structure for transmitting loads comprising a shell, a core disposed within said shell said core and shell being arranged in stressed transmitting relation, said core being initially loaded in the same manner as when the structure is normally loaded to a point beyond its elastic limit to produce a permanent set in the core, said loading being removed prior to the actual use of the structure.

8. A structure for transmitting loads comprising a cylindrical shell readily compressible axially and resisting radial expansion, a core within said shell compressible axially and being in direct contact with said shell, said core transmitting compression stresses to said shell and arranged to set up circumferential tensile stresses in said shell, said core maintaining a predetermined pressure against said shell greater than normal, and said shell while so stressed resisting appreciable shortening of the core.

9. A structure for transmitting loads comprising a tubular shell constructed of a material having a relatively high elastic limit, a core within said shell constructed of a compressible material having under compression a lower elastic limit than said shell, said core in the vicinity of the outermost portion thereof being in direct contact with said tubular shell so as to transmit stresses to said shell, said core being stressed in compression beyond its elastic limit to receive a permanent set whereby an initial stress is set up in said shell, said latter stress being below the elastic limit of the material of the shell.

10. A structure for transmitting loads comprising a tubular shell, a core within said shell arranged in direct contact with said shell substantially from one end of the shell to the other so as to transmit stresses to the shell upon the application of longitudinal loads to the core, said shell being constructed of a material having a higher tensile strength than said core, said core being initially compressed beyond its elastic limit to bring said shell into tension.

11. A structure for transmitting loads comprising a tubular shell, formed of a helix of wire and a core within said shell compressible longitudinally and arranged in direct contact with said shell substantially from one end of the shell to the other so as to transmit stresses to the shell upon the application of longitudinal loads to the core, said wire being constructed of a material having a higher tensile strength than said core, said core being initially compressed longitudinally beyond its elastic limit to bring said wire into tension and to maintain said wire in tension after the load producing initial compression has been removed.

12. A structure for transmitting loads comprising a tubular shell formed of a helix of wire and a core constructed of concrete and cast within said shell, said core being in direct contact with the shell from one end of the structure to the other so as to transmit stresses to the shell upon the application of a longitudinal load to the core, said core being temporarily stressed beyond its elastic limit prior to the ultimate use of the structure by longitudinal compressive loading to produce an initial tensile stress in the wire.

13. A structure for transmitting loads comprising a tubular shell constructed of metal, a core within said shell constructed of concrete and cast within said shell, said core being in direct contact with the shell from one end of the structure to the other so as to transmit stresses to the shell upon the application of a longitudinal load to the core, said core being initially compressed beyond its elastic limit by longitudinal loading to bring the tubular shell into tension.

14. A structure for transmitting loads comprising a tubular shell formed of a helix of wire having an ultimate strength of a minimum of 150,000 pounds per square inch, and a core within said shell constructed of concrete, said core being in direct contact with said shell, said core being compressed beyond its elastic limit prior to the ultimate use of the structure to produce an initial tensile stress in the wire.

15. A structure for transmitting loads comprising a tubular shell formed of a helix of flat ribbon and a core within said shell having a lower elastic limit than said ribbon, said core being in direct contact with said shell, said core being initially stressed beyond its elastic limit through compression to place an initial tension on said ribbon.

16. A structure for transmitting loads, comprising a core formed of concrete, a helical reinforcing member of steel within said core having a volume of between fifteen to twenty percent of the volume of said core, said core being in direct contact with said shell, said core being initially stressed beyond its elastic limit through compression to bring said reinforcing member into tension.

17. A structure for transmitting loads comprising a tubular shell, a core within said shell, said core being in direct contact with said shell, said shell being constructed of a material having a higher tensile strength than said core, said core being initially compressed to stress the core beyond its elastic limit, and the compressing thereof discontinued prior to its installation to produce a permanent set in the core.

GEORGE A. MANEY.